US006867585B2

United States Patent
Hrubes

(10) Patent No.: US 6,867,585 B2
(45) Date of Patent: Mar. 15, 2005

(54) CIRCUIT AND METHOD FOR COMPENSATING FOR TEMPERATURE

(75) Inventor: Franz Hrubes, Rotthalmünster (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 0 days.

(21) Appl. No.: 10/684,647

(22) Filed: Oct. 14, 2003

(65) Prior Publication Data

US 2004/0075452 A1 Apr. 22, 2004

Related U.S. Application Data

(63) Continuation of application No. PCT/DE02/01350, filed on Apr. 11, 2002.

(30) Foreign Application Priority Data

Apr. 12, 2001  (DE) .......................................... 101 18 718
Mar. 22, 2002 (DE) .......................................... 102 12 999

(51) Int. Cl.[7] .............................................. G01N 27/72
(52) U.S. Cl. .................................. 324/225; 324/207.26
(58) Field of Search ........................... 324/225, 207.11, 324/207.12, 207, 15, 207.26

(56) References Cited

U.S. PATENT DOCUMENTS

| 4,956,606 A | 9/1990 | Kwiatkowski et al. |
| 5,180,978 A | 1/1993 | Postma et al. |

FOREIGN PATENT DOCUMENTS

| EP | 0 049 304 A1 | 4/1982 | |
| JP | 54170390 | * 12/1979 | ................ 324/225 |
| JP | 57110904 | * 9/1982 | ............ 324/207.11 |
| WO | WO 00 70368 A1 | 11/2000 | |

* cited by examiner

Primary Examiner—N. Le
Assistant Examiner—Reena Aurora
(74) Attorney, Agent, or Firm—Alston & Bird LLP

(57) ABSTRACT

A circuit (1) for compensating for temperature with a sensor operating by the eddy current principle for measuring physical conditions of an object. The circuit includes an evaluation unit (3) for evaluating a measuring signal (100) of the sensor (2). The sensor (2) and the evaluation unit (3) are interconnected via a connection cable (4). For the purpose of minimizing or preventing to the greatest extent temperature caused interferences, an additional compensation line (5) is provided which compensates for the temperature of the connection cable (4). A corresponding method for compensating for temperature is described.

28 Claims, 3 Drawing Sheets

CIRCUIT AND METHOD FOR COMPENSATING FOR TEMPERATURE

CROSS REFERENCE TO RELATED APPLICATION

The present application is a continuation of international application PCT/DE02/01350, filed 11 Apr., 2002, and which designates the U.S. The disclosure of the referenced application is incorporated herein by reference.

BACKGROUND OF THE INVENTION

The invention relates to a circuit arrangement and a method for compensating for temperature with a sensor operating by the eddy current principle and preferably comprising a measuring coil for measuring physical conditions, and with an evaluation unit for evaluating the measuring signal of the sensor, with the sensor and the evaluation unit being interconnected via a connection line.

Circuit arrangements and methods for compensating for temperature have been known in practical operation for a long time. In the case of circuit arrangements which operate by the eddy current principle, the impedance change of the measuring coil of a sensor is measured, which results from the approximation of an electrically conductive object of measurement. Subsequently, the impedance change is evaluated, so that a measuring signal results, which reflects as much as possible in a linear relationship, for example, the spacing between the sensor and the object of measurement. However, since both the impedance of the measuring coil used for the measurement and the electric and magnetic conductivity of the object of measurement and, thus, the reaction of the object of measurement to the sensor also change with the temperature, a corresponding temperature compensation is required for obtaining a correct measuring signal. At the same time, it is to be considered that the temperature influence requires different compensation values as a function of the measuring distance.

A possibility of accomplishing this, lies, for example, in measuring the temperature of the sensor. It is then possible to use the temperature measuring signal for selecting corresponding correction values from a stored table, or for interpolating them, if need be, and for correcting therewith the measuring signal. As an alternative, it is possible to offset the temperature measuring signal directly against the measuring signal, for example, by a simple or multiple addition and/or by multiplying correction factors with the measuring signals. This may occur before and/or after a linearization of the measuring signal, possibly even by an additional nonlinear change of the temperature measuring signal before the correction step. In this manner, it is possible to attain a simple temperature compensation.

However, it is often necessary to arrange the sensor in a location removed from the evaluation unit, for example, for reasons of space or for reasons of environmental conditions. Frequently, there is likewise no space directly available on the sensor to perform an electronic preprocessing of the measuring signal. It is therefore necessary to connect the sensor via a connection line to the evaluation unit. However, this connection line represents an additional impedance, which itself is again temperature-dependent and, thus, also generates temperature-dependent measuring errors. In many cases, the temperature of the sensor is also not identical with the temperature of the connection line, so that a temperature compensation, which is derived only from the temperature of the sensor, does not simultaneously compensate the measuring error caused by the connection line.

EP 0 049 304 B1 discloses a circuit arrangement and a method for compensating for temperature with a sensor operating by the eddy current principle for measuring physical conditions, and with an evaluation unit for evaluating the measuring signal of the sensor. The sensor, which includes a measuring coil, and the evaluation unit are interconnected by a connection cable. A suitable adjustment of the impedances of the measuring coil, the object of measurement, and the connection cable results in a temperature response, which adequately compensates with the method disclosed therein also the influence of the connection cable. However, this adjustment and conformity of the impedances is to be realized only in special cases. Since the sensor is normally used toward different objects of measurement with correspondingly different temperature-dependent impedance changes, and since, as a result of the use, often narrow limits are set to the possible dimensions of both the measuring coil and the used wire diameter, major measuring errors also occur in the case of both the circuit arrangement and the method disclosed in EP 0 049 304 B1 because of the different temperatures of the sensor and the connection cable.

It is therefore an object of the present invention to provide both a circuit arrangement and a method for compensating for temperature of the initially described type, wherein temperature caused interferences, in particular temperature caused interferences produced by the connection line, are minimized or avoided to the greatest extent with a constructionally simple layout.

SUMMARY OF THE INVENTION

In accordance with the invention, the foregoing object is accomplished by a circuit for compensating for temperature and which includes an additional compensation line for compensating for the temperature of the connection line.

Furthermore, with respect to a method, the foregoing object is accomplished by a method of compensating for temperature in a process of the initially described type and which is improved and further developed by the provision of an additional compensation line arranged for compensating for the temperature of the connection line.

In accordance with the invention, it has been recognized that a measuring error that is caused by the temperature of the connection line, can be corrected not solely by adjusting the impedances of the measuring coil, the object of measurement, and the connection line. Rather, it is necessary to measure the temperature of the connection line separately, so as to permit a reliable compensation. To this end, use is made of the ohmic resistance of the additionally arranged compensation line, which changes with the temperature. In accordance with the invention, it is thus possible to measure the temperature along the connection line as a mean value over the entire length of the connection line, to derive therefrom a correction signal for the measured value, and to perform a corresponding correction. A further advantage of the circuit arrangement according to the invention may be seen in that in the case of a mechanical realization of the sensor, in particular with respect to dimensions and the impedance of the measuring coil, greater freedoms than until now are possible, since an adjustment between the impedances of the measuring coil, the object of measurement, and the connection line is no longer needed.

In a particularly advantageous manner, it would be possible to realize the compensation line as a cable or wire, which would not increase the manufacturing costs of the circuit arrangement to any significant extent. In a further advantageous manner, the connection line could be constructed as a coaxial cable. This would be especially advantageous with respect to a satisfactory conductivity of the connection cable at high frequencies.

Within the scope of a particularly space saving configuration, the compensation line could be an integral part of the connection cable. As a result, the compensation line would also be excellently protected against external mechanical influences. This would be especially well realizable, if the compensation line were provided as a wire that could be integrated into the connection cable in a very simple manner.

With respect to a particularly accurate compensation of the temperature, the compensation line could be shielded against the connection cable. This could clearly reduce or largely prevent the influence of the compensation line on the impedance of the connection cable and, thus, the measuring circuit.

As an alternative or in addition, the compensation line could also extend parallel to the connection cable. This could prevent in a very simple manner an influence of the impedance of the connection cable, without having to provide a special shield for the compensation line.

With respect to a particularly simple embodiment, the compensation line could connect at one end to the shield of the coaxial cable. In general, the shield of a coaxial cable has a low ohmic resistance.

With respect to yet again a particularly simple configuration, the compensation line could connect to the coaxial cable at the end adjacent the sensor. In this instance, the coaxial cable could serve as a return line of the compensation line to the evaluation unit.

As an alternative thereto, the compensation line could include a separate return line. In the case of damage, this would permit exchanging the compensation line in a particularly simple manner. In this instance, the return line could extend parallel to the connection cable back to the evaluation unit, which would require an additional connection between the evaluation unit and the compensation cable.

In a further advantageous manner, the compensation line could be supplied from a signal source, preferably with direct current, which would permit generating a temperature dependent compensation line signal, in particular a temperature dependent dc voltage signal. The temperature dependent compensation line signal would therefore decrease on the resistance of the compensation line.

In addition or as an alternative, the compensation line could be supplied from a signal source with a low frequency alternating current, which would permit generating a temperature dependent compensation line signal, in particular a low frequency ac voltage signal. With the aid of the direct current or the low frequency alternating current, which flows through the compensation line, it would be possible to measure the resistance of the compensation line. Consequently, one could measure the average temperature of the connection cable, since the resistance of the compensation line changes to a large extent linearly with the temperature.

With respect to a particularly simple temperature compensation, a preferably analog circuit could be arranged for preparing the temperature dependent signal, in particular the temperature dependent dc voltage signal, and/or the low frequency ac voltage signal, and/or for generating a compensation signal. In this process, the circuit could prepare the compensation signal in such a manner that the thus-resulting temperature-dependent dc voltage or ac voltage signal can be used for a separate correction of the temperature influence on the connection cable.

In a particularly advantageous manner, it would be possible to arrange for a further processing of the compensation signal generated by the circuit, components for correcting the temperature dependent compensation signal, in particular for multiplying the temperature dependent compensation signal with at least one correction factor. The components for the correction could be used to the extent that the compensation applies to the entire measuring range. In this connection, the correction factors could be adapted to the temperature variation of the sensor, in particular the measuring coil of the sensor, for purposes of attaining a particularly satisfactory temperature compensation.

In a particularly simple manner, one could arrange a generator for generating a high frequency ac signal, which can be used for supplying the measuring coil for purposes of generating a measuring signal, in particular a high frequency ac measuring signal. With that, it would be possible to generate a high frequency ac voltage measuring signal, which is dependent both on the temperature and on the physical quantity, for example, the distance of the sensor from an object of measurement.

With respect to an especially satisfactory temperature compensation a further generator could be arranged for generating a dc signal and/or a low frequency ac signal, which can be used for supplying the measuring coil. This dc signal and/or ac signal could be adapted for superposition on the high frequency ac signal, which is used for generating the measuring signal that is dependent on the physical quantity. The dc signal or low frequency ac signal that is superposed on the high frequency ac signal, generates on the ohmic resistance of the measuring coil and the connection cable, a dc signal or low frequency ac voltage signal, which changes to a large extent linearly with the temperature of the measuring coil and the connection cable.

Within the scope of yet again a very excellent temperature compensation, one could arrange a preferably analog circuit for separating and processing the high frequency measuring signal and the superposed dc voltage signal, and/or the low frequency ac voltage signal for generating a temperature dependent compensation measuring signal, in particular a temperature dependent dc voltage signal. This temperature dependent dc voltage measuring signal could then make it possible to compensate the temperature of the sensor, or the measuring coil, and possibly the connection cable to a limited extent.

With respect to yet again a very simple configuration, a component could be arranged for forming a difference signal of the temperature dependent compensation measuring signal and the corrected temperature dependent compensation signal. As a result, the signal being thus generated, which is preferably a dc voltage signal, could be dependent only on the temperature of the measuring coil. In a particularly simple manner, this component could be a comparator.

Within the scope of yet again a very excellent temperature compensation, it would be possible to arrange components for correcting the difference signal and for correcting the temperature dependent compensation signal, in particular for multiplying the difference signal, and/or the temperature dependent compensation signal with correction factors. The necessary correction factors could be adapted to the temperature variation of the measuring coil and/or the object of measurement.

In a particularly advantageous manner, one could arrange a component for demodulating the high frequency measuring signal for generating a dc voltage measuring signal that is dependent on the physical quantity. In this case, the dc voltage measuring signal is dependent on both the physical quantity and the temperature, and would permit further processing in a very simple manner, in particular compensating the temperature in a very simple manner. In quite a simple way, the component for demodulating could be a demodulator.

In a further advantageous manner, a component could be arranged for forming the composite signal of the dc voltage signal that is dependent on the physical quantity, and/or the corrected difference signal, and/or the corrected temperature dependent compensation signal. In this instance, the necessary correction factors are to be adapted to the temperature variation of the measuring coil and the object of measurement.

To linearize the signals, one could arrange a linearization circuit for linearizing the composite signal. This would enable the processing of nonlinear signals in a particularly simple manner.

Within the scope of yet again a very satisfactory temperature compensation, one could arrange components for correcting the difference signal and for correcting the temperature dependent compensation signal, in particular for multiplying the difference signal and/or the compensation signal with correction factors. Likewise in this instance, the correction factors could be adapted to the temperature variation of the measuring coil and the object of measurement for being able to ensure a very satisfactory temperature compensation.

Furthermore, one could arrange a component for forming a further composite signal of the linearized composite signal, and/or the corrected difference signal, and/or the corrected temperature dependent compensation signal, whereby the actual temperature compensation of the measuring signal would occur. At the output of the summator, the measuring signal having been temperature compensated and being only dependent on the physical quantity would be present, which could then be further processed in a very simple manner. In this connection, the correction factors are computed before and after the linearization, so that the compensation applies to the entire measuring range of the physical quantity.

To adjust the circuit arrangement to a certain resonant frequency, one could provide a supplementary capacitor for tuning the resonant frequency of the oscillatory circuit that is formed by the measuring coil, and/or the capacitance, and/or the inductance of the connection cable, and/or the supplementary capacitor. The size of the supplementary capacitor could be determined in the usual way. The high frequency signal, which generates the measuring signal would be applied to this oscillatory circuit in the previously described manner.

With respect to particularly satisfactory temperature compensation, one could additionally arrange a temperature sensor in the direct vicinity of the measuring coil for measuring the temperature of the sensor. This could occur in addition or as an alternative to the superposition of the high frequency ac signal with a dc signal and/or a low frequency ac signal.

In a particularly advantageous manner, the temperature sensor could be thermally coupled with the measuring coil. Within the scope of a particularly simple configuration, the temperature sensor could be integrated into the sensor.

Within the scope of again a very simple configuration, it would be possible to arrange a generator for generating a temperature sensor signal. The temperature sensor signal could be in particular a dc voltage signal and/or a low frequency ac voltage signal.

With respect to a particularly simple further processing, one could arrange an analog circuit for preparing and generating a temperature dependent temperature sensor measuring signal. The processing of the temperature sensor measuring signal could then occur, as above described, analogously to the processing of the dc voltage signal or the low frequency ac voltage signal that is dependent on the temperature of the measuring coil and the connection line.

The method of the present invention could be used in particular for operating a circuit arrangement as has been described above. The method is advantageous in that an additionally arranged line, or compensation line, achieves a reliable compensation of all relevant temperature influences.

With respect to an especially reliable temperature compensation, a calibration of the circuit arrangement could occur as a function of the temperature of the sensor. In a particularly advantageous manner, this calibration could occur before the startup, in particular before the first startup of the sensor. In addition or as an alternative, a calibration could occur as a function of the temperature of the connection line.

Based on the resultant signals of the calibration, it would be possible to compute correction factors. These correction factors could be determined based on the measured temperature compensation signals and the measuring signals, which are offset against one another, so that the adjustment values for the temperature compensation, i.e., the values of addition that interrupt before and after the linearization of the measuring signal, compensate it equally well irrespective of the physical quantity.

In a particularly advantageous manner, a table with temperature dependent correction factors could be prepared by means of a processor, and/or stored in a memory. During the measurements, it would then be possible to select from the table the correction factors as a function of the measured temperature for compensating for the temperature of the measuring signal, thereby enabling a particularly satisfactory temperature compensation. The correction factors could then be used for correcting the temperature dependent measuring signals. During the actual measurement of the physical quantities, it would be possible to select the corresponding values respectively as a function of the measured temperature values, in particular with the aid of the processor, and to correct the measuring signal accordingly by addition before and after the linearization. In the case of intermediate values, one may perform an interpolation of the corresponding table values.

There exist various possibilities of improving and further developing the teaching of the present invention in an advantageous manner. To this end, one may refer to the following description of preferred embodiments of a circuit arrangement according to the invention and a method according to the invention for compensating for temperature with reference to the drawing. In conjunction with the description of the preferred embodiments with reference to the drawing, also generally preferred improvements and further developments of the teaching are described.

DETAILED DESCRIPTION OF THE PREFERRED EMBODIMENTS

Figure 1:
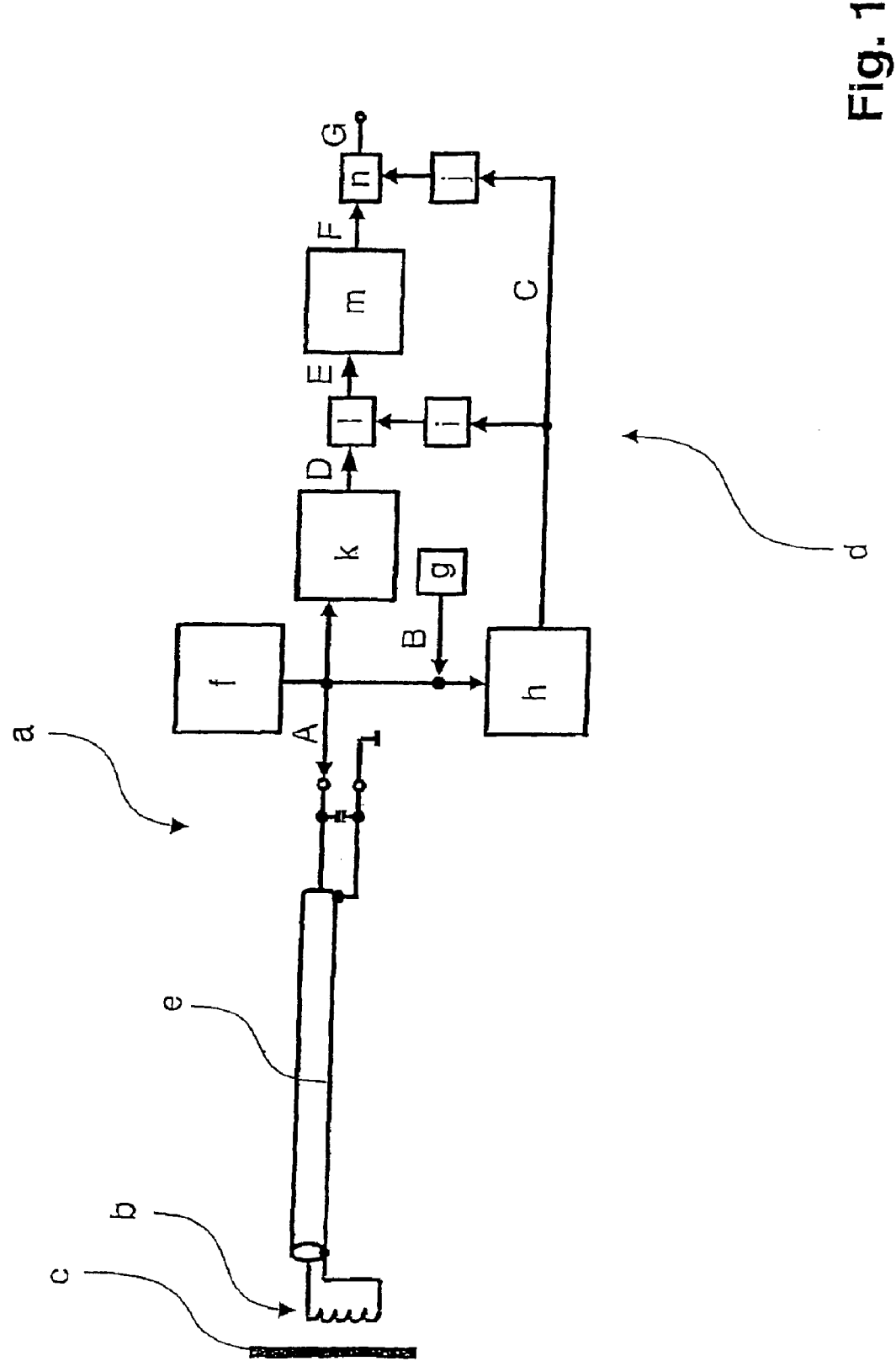
FIG. 1 is a schematic view of a known circuit arrangement for compensating for temperature.

FIG. 1 is a schematic view of a known circuit arrangement a for compensating for temperature. The circuit arrangement comprises a sensor b that operates by the eddy current principle and includes a measuring coil for measuring the distance of the sensor b from an object of measurement c. An evaluation unit d for evaluating the measuring signal of the sensor b connects to the sensor b via a connection line e.

A generator f is used for generating a high-frequency ac signal A, which is supplied to the measuring coil of the sensor b. A further generator g generates a dc signal B, which is superposed on the high frequency ac signal A generated by generator f.

Whereas the high frequency measuring signal generated by the high frequency ac signal A, which is accordingly a high frequency ac voltage signal, is used for measuring the distance of the sensor b from the object of measurement c, the dc signal B is used for generating a dc voltage both on the resistance of the connection line e and on the measuring coil of the sensor b. This means that the dc voltage signal B is dependent only on the temperature of the sensor b and the connection line e. To separate and process the high frequency ac voltage signal A and the superposed dc voltage signal B, an analog circuit h is provided.

A compensation signal C that is generated by a circuit h, is multiplied by means of two components i and j for correcting the temperature dependent compensation signal C with a correction factor Ka and Kb respectively.

To demodulate the high frequency measuring signal A, a component k is arranged for generating a distance dependent dc voltage measuring signal D. To form a composite signal E, a component l is arranged. The composite signal E comprises the distance dependent dc voltage measuring signal D and the compensation signal C that has been corrected with the correction factor Ka. To linearize the composite signal E, a linearization circuit m is arranged. At the output of the linearization circuit m, a linearized composite signal F is present.

To obtain a temperature compensated measuring signal G, a further component n is provided for forming a further composite signal, which corresponds to the temperature-compensated measuring signal G. The composite signal G comprises in this instance the linearized composite signal F as well as the compensation signal C that has been corrected with correction factor Kb.

Figure 2:
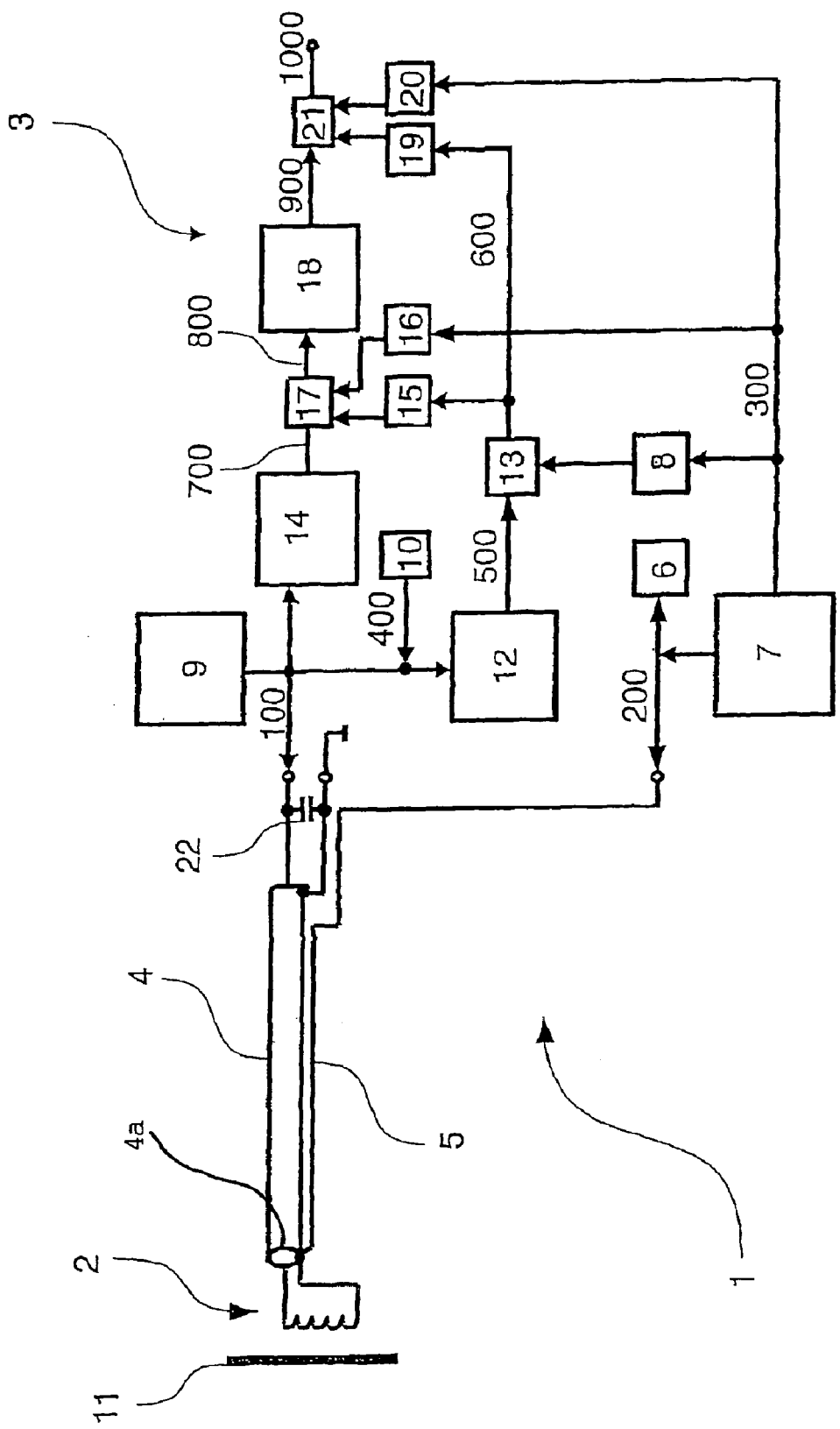
FIG. 2 is a schematic view of an embodiment of a circuit arrangement for compensating for temperature in accordance with the invention.

A circuit arrangement 1 of the present invention as shown in FIG. 2 comprises a sensor 2 operating by the eddy current principle and comprising a measuring coil for measuring physical quantities, and an evaluation unit 3 for evaluating the measuring signal of sensor 2, with the sensor 2 and the evaluation unit 3 being interconnected via a connection cable 4.

In accordance with the invention, the circuit arrangement 1 includes an additional line, namely compensation line 5 for compensating for the temperature of connection line 4. In the present embodiment, the compensation line 5 is realized as a wire, and the connection cable 4 is a coaxial cable. The compensation line 5 extends parallel to the connection cable 4, and connects to the shield 4a of the coaxial cable at the end of the coaxial cable adjacent the sensor. Thus, the coaxial cable serves as a low resistance return line of compensation line 5 to the evaluation unit 3.

A source of current 6 supplies the compensation line 5 with a direct current, whereby a temperature dependent compensation line signal 200 is generated, which is accordingly a temperature dependent dc voltage signal. For preparing the temperature dependent compensation line signal 200, an analog circuit 7 is arranged. The circuit 7 generates a compensation signal 300, which is a dc voltage in the present embodiment, and which is dependent only on the temperature of the wire and, accordingly, on the temperature of the compensation line 5. The compensation signal 300 as generated by the circuit is multiplied with a correction factor K1 by means of a component 8 for correcting the temperature dependent compensation signal 300.

A generator 9 is used for generating a measuring signal, in particular a high frequency ac signal 100, which is supplied to the measuring coil of the sensor 2. A further generator 10 generates a dc signal 400, which is superposed on the high frequency ac voltage signal 100 that is generated by generator 9.

Whereas a high frequency ac signal 100 is used for measuring the physical condition, in the present embodiment the distance from an object of measurement 11, the dc signal 400 is used for generating a dc voltage on the resistance of the connection line 4 and the measuring coil of the sensor 2. This means that the dc voltage signal is dependent only on the temperature of the sensor 2 and the connection line 4. For separating and processing the high frequency ac voltage signal 100 and the superposed dc voltage signal 400, an analog circuit 12 is provided.

A compensation measuring signal 500 that is generated by the analog circuit 12, as well as the temperature dependent compensation signal 300 that has been corrected with correction factor K1, are subtracted from each other by means of a component 13. A resultant difference signal 600 is thus dependent only on the temperature of the measuring coil of sensor 2.

To demodulate the high frequency measuring signal, a component 14 is arranged, which is realized in the present embodiment as a demodulator, for generating a distance dependent dc voltage measuring signal 700. This dc voltage measuring signal 700 is not temperature compensated.

For correcting the difference signal 600 as well as for correcting the temperature dependent compensation signal 300, components 15, 16 are provided, which multiply the difference signal 600 with a correction factor K2, and the compensation signal 300 with a correction factor K3.

To form a composite signal 800, a component 17 is arranged. The composite signal 800 comprises the distance dependent dc voltage signal 700, as well as the difference signal 600 corrected with correction factor K2, and the compensation signal 300 corrected with correction factor K3. To linearize the composite signal 800, a linearization circuit 18 is arranged. The output of the linearization circuit 18 supplies a linearized composite signal 900.

Furthermore, components 19, 20 are arranged for correcting the difference signal 600 and for correcting the temperature dependent compensation signal 300. The component 19 multiplies the difference signal 600 with a correction factor K4, and the component 20 multiplies the compensation signal 300 with a correction factor K5.

To obtain a temperature independent measuring signal 1000, a further component 21 is provided for forming a further composite signal, which corresponds to the temperature compensated measuring signal 1000. The composite signal 1000 comprises the linearized composite signal 900, as well as the difference signal 600 that has been corrected with the correction factor K4, and the temperature dependent compensation signal 300 that has been corrected with the correction factor K5.

Also arranged is a supplementary capacitor 22 for tuning the resonant frequency of the oscillatory circuit that is formed by the measuring coil of the sensor, the capacitance and the inductance of the connection cable 4, and by the supplementary capacitor 22.

Before a first startup of the sensor 2, a calibration proceeds as a function of the temperature of the sensor 2 together with the object of measurement 11, and separately as a function of the temperature of the connection cable 4. The thermal stresses measured in this process and the measuring signals are offset against one another such that the correction factors K1–K5 for the temperature compensation, i.e., the values of addition that interrupt before and after the linearization of the measuring signal, compensate the latter equally satisfactorily irrespective of the measuring distance.

In this process, a temperature dependent table of the correction values K1–K5 is set up in addition, so that during the actual measurement of the distance, the corresponding values are inquired, each as a function of the measured temperature values, with the aid of a computer (not shown), and that the measuring signal is corrected accordingly by addition before and after the linearization. In the case of intermediate values, an iteration of the corresponding table values is performed.

Figure 3:
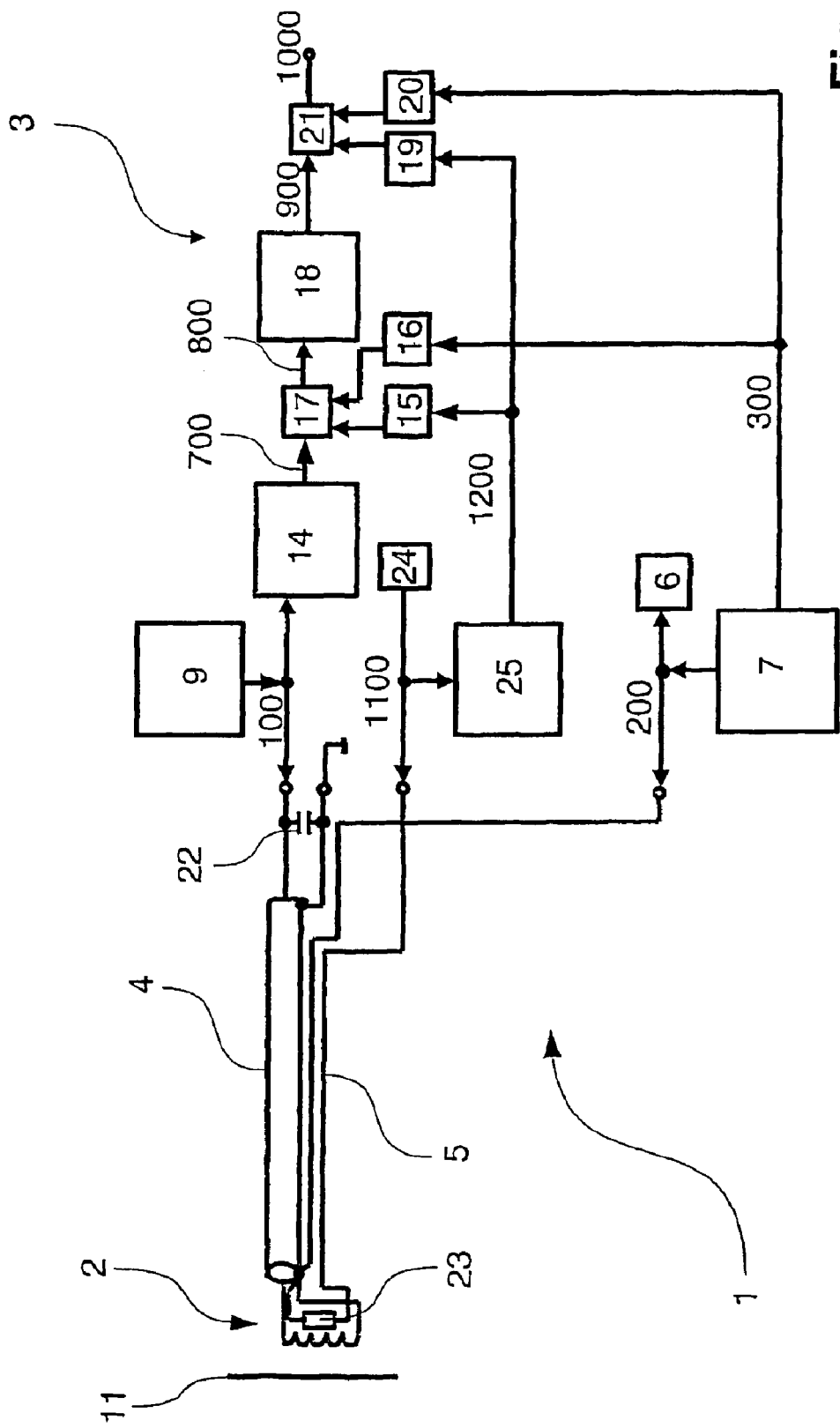
FIG. 3 is a schematic view of a further embodiment of a circuit arrangement according to the invention.

FIG. 3 illustrates a further embodiment of a circuit arrangement according to the invention. In this embodiment, a temperature sensor 23 is arranged in the direct vicinity of the measuring coil for measuring the temperature of the sensor 2 in a way that the temperature sensor 23 is thermally coupled with the measuring coil of the sensor 2.

To generate a temperature sensor signal 1100, a generator 24 is provided. Instead of the superposed dc signal 400 of the embodiment shown in FIG. 2, the temperature sensor 23 is provided for compensating the temperature of the sensor 2. The measured temperature signal 1100 can be compensated corresponding to the dc voltage signal 400 by means of an analog circuit 25. The circuit 25 is used to prepare the temperature sensor signal 1100, so that as a function of the temperature of the measuring coil of sensor 2, a temperature sensor measuring signal 1200 is again generated, which corresponds to the temperature dependent compensation measuring signal 500 of the embodiment of FIG. 2. The compensation of the temperature now occurs analogously to the compensation in the embodiment of FIG. 2. To avoid repetitions, the above description of the embodiment of FIG. 2 is herewith incorporated by reference. Not needed in this embodiment is only the formation of the difference between the dc voltage signal 400 and the corrected compensation signal 300, since the temperature sensor measuring signal 1200 is already only dependent on the temperature of the measuring coil of sensor 2.

As regards further details, the general part of the specification and the attached claims are herewith incorporated by reference for purposes of avoiding repetitions.

What is claimed is:

1. A circuit for measuring a physical condition of an object, comprising
    a sensor configured to operate by the eddy current principle,
    an evaluation unit connected to the sensor via a connection line for evaluating a measuring signal of the sensor,
    a compensation line connected to the evaluation unit for compensating for the temperature of the connection line, and
    a direct current or a low frequency alternating current signal source connected to the compensation line so as to permit the generation of a temperature dependent compensation line signal (200).

2. The circuit of claim 1, wherein the compensation line comprises a cable or wire.

3. The circuit of claim 2, wherein the connection line comprises a coaxial cable.

4. The circuit of claim 3, wherein the compensation line connects at one end to the shield of the coaxial cable.

5. The circuit of claim 4, wherein the compensation line connects to the coaxial cable at the end adjacent the sensor.

6. The circuit of claim 5, wherein the coaxial cable serves as a return line of the compensation line to the evaluation unit.

7. The circuit of claim 1, wherein the compensation line is connected to the connection line.

8. The circuit of claim 7, wherein the compensation line is shielded against the connection line.

9. The circuit of claim 1, wherein the compensation line is arranged parallel to the connection line.

10. The circuit of claim 1, wherein the compensation line has a separate return line.

11. The circuit of claim 1, further comprising an analog circuit responsive to the temperature dependent compensation line signal (200), and for generating a compensation signal (300).

12. The circuit of claim 11, further comprising a circuit component arranged for correcting the compensation signal (300) generated by the analog circuit by multiplying the compensation signal with at least one correction factor.

13. The circuit of claim 12, wherein the sensor comprises a measuring coil, and further comprising a generator for generating a high frequency alternating current measuring signal (100) which is supplied to the measuring coil.

14. The circuit of claim 13, further comprising a further generator arranged for generating a direct current signal (400) and/or a low frequency alternating current signal, which is superposed with the high frequency alternating current measuring signal (100).

15. The circuit of claim 14, further comprising an analog circuit arranged for separating and processing the high frequency alternating current measuring signal (100), and the superposed signal and for generating a temperature dependent compensation measuring signal (500).

16. The circuit of claim 15, further comprising a component arranged for forming a difference signal (600) of the temperature dependent compensation measuring signal (500) and the corrected temperature dependent compensation signal (300).

17. The circuit of claim 16, further comprising components arranged for correcting the difference signal (600), and for correcting the temperature dependent compensation signal (300), by multiplying the difference signal and/or the temperature dependent compensation signal (300) with correction factors.

18. The circuit of claim 13, further comprising a component arranged for demodulating the high frequency measuring signal (100) in order to generate a direct current voltage measuring signal (700) that is dependent on the physical condition.

19. The circuit of claim 18, further comprising a component arranged for forming a composite signal (800) of the direct current voltage measuring signal (700) that is dependent on the physical condition, and/or the corrected difference signal (600), and/or the corrected temperature dependent compensation signal (300).

20. The circuit of claim 19, wherein a linearization circuit is arranged for linearizing the composite signal (800) to produce a linearized composite signal (900).

21. The circuit of claim 20, further comprising a component arranged for forming a further composite signal (1000) of the linearized composite signal (900), and/or the corrected difference signal (600), and/or the corrected temperature dependent compensation signal (300).

22. The circuit of claim 1, wherein the sensor comprises a measuring coil, and further comprising a supplementary capacitor arranged for tuning the resonant frequency of the oscillatory circuit formed by the measuring coil, and/or the capacitance, and/or the inductance of the connection line, and/or the supplementary capacitor.

23. The circuit of claim 1, further comprising a temperature sensor arranged in the direct vicinity of the measuring coil for measuring the temperature of the sensor.

24. The circuit of claim 23, wherein the sensor comprises a measuring coil, and wherein the temperature sensor is thermally coupled with the measuring coil.

25. The circuit of claim 23, further comprising a generator arranged for generating a temperature sensor signal (1100).

26. The circuit of claim 25, further comprising an analog circuit arranged for preparing and generating a temperature dependent temperature sensor measuring signal (1200).

27. A method of measuring a physical condition of an object comprising the steps of positioning an object to be measured adjacent a sensor which operates by the eddy current principle, supplying a high frequency alternating current signal to the sensor via a connection line and so as to produce a measuring signal, supplying the high frequency alternating current signal to an evaluation circuit to generate a temperature compensated measuring signal, and including connecting an additional compensation line to the connection line so as to compensate for the temperature of the connection line, calibrating the evaluation circuit as a function of the temperature of the sensor, and wherein the calibrating step includes calibrating the evaluation circuit as a function of the temperature of the connection line.

28. The method of claim 27, wherein the calibration step includes preparing a table with temperature dependent correction factors, and wherein during the measurement, the correction factors are selected from the table as a function of the measured temperature for correcting the temperature indicated by the measuring signal.

* * * * *